June 12, 1923. 1,458,614

C. W. BOGART

TAP

Filed April 8, 1919

INVENTOR
C. W. Bogart
BY
Dull, Warfield & Dull
ATTORNEY

Patented June 12, 1923.

1,458,614

UNITED STATES PATENT OFFICE.

CHARLES W. BOGART, OF PORT CHESTER, NEW YORK, ASSIGNOR TO RUSSELL, BURDSALL & WARD BOLT AND NUT COMPANY, OF PORT CHESTER, NEW YORK, A CORPORATION OF NEW YORK.

TAP.

Application filed April 8, 1919. Serial No. 288,581.

*To all whom it may concern:*

Be it known that I, CHARLES W. BOGART, a citizen of the United States, residing at Port Chester, in the county of Westchester and State of New York, have invented certain new and useful Improvements in Taps, of which the following is a full, clear, and exact description, such as will enable others skilled in the art to which it appertains to make and use the same.

This invention relates to devices for cutting screw threads on nuts and the like, and with respect to its more specific features, to taper taps for the purpose referred to.

One of the objects of the invention is the provision of a practical tap wherewith effective threading of metallic nuts may be accomplished with the expenditure of a minimum amount of power.

Another object of the invention is the provision of an efficient tap wherewith reaming and breakage may be reduced and the life of the tap increased.

Another object is the provision of a tap which will operate efficiently upon the walls of tap openings in nuts and the like when the axes of such openings are off center or incline to the axis of the nut.

Other objects will be in part obvious and in part pointed out hereinafter.

The invention accordingly consists in the features of construction, combinations of elements and arrangements of parts which will be exemplified in the construction hereinafter set forth, and the scope of the application of which will be indicated in the following claims.

In the accompanying drawing forming part of this specification and wherein similar reference characters refer to similar parts throughout the several views,—

Figure 1:
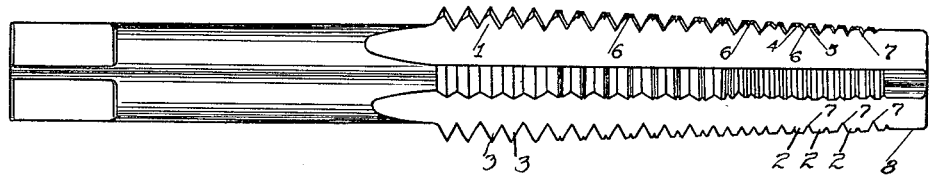
Figure 1 is a side elevation of a tap embodying the invention.
Figure 2:
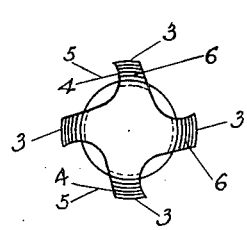
Fig. 2 is an end view of Fig. 1;

Referring now more specifically to the drawing, it is observed that the invention is illustrative as embodied in a hardened steel screw threaded chamfered, or taper tap, the cutting faces of which are provided upon lands formed by longitudinally disposed flutes, or grooves, which intersect the threads of the tap, four lands being shown. The normal thread of the tap is shown at 1 being near the shank end of the tap and of dimensions to give the desired shape and size of thread to the article to be tapped, as for instance a nut blank. In the embodiment illustrated the tap is tapered, the normal thread being chamfered for a distance from the leading end of the tap. The numeral 2 indicates the top of the chamfered thread and the numeral 3 indicates the top of the normal thread, the chamfered and normal portions of the thread being thus at different portions axially of the tap.

In the operation of tapping it not infrequently happens that the tap does not readily take hold and the result follows that the article to be tapped may be reamed, or bored, in parts instead of having the thread cut uniformly therein. Where the depth of thread on the tap is small the thread formed in the article is relatively weak, and if the material operated on is tough the thread of the tap may cut away the material of the article across the portion which should be left to form the thread, thus making an imperfect operation.

In the tap illustrated it will be observed that the top of the chamfered thread has a plurality of cutting faces 4 and 5 facing in the same operative direction; i. e., as the tap rotates in one direction both faces 4 and 5 operate to cut. Although the plurality of cutting faces on the tap may be produced in any efficient way, in the present embodiment they are provided by an auxiliary thread groove or grooves 6 in the top of the chamfered thread, the auxiliary groove or grooves opening into the cutting face of the tap as illustrated. Also, in the present embodiment, the auxiliary thread groove is provided on the top of the chamfered thread on each land of the tap opening into the cutting faces thereof, though it is to be understood that it is not essential that the groove be provided in all of the cutting faces. More practical advantages are believed to follow by providing the auxiliary groove or grooves on the thread appearing on each land, especially where near the leading end of the tap.

The auxiliary thread grooves may be extended below the bottoms of the threads into the material of the base of the tap, as illustrated at 7, so as to communicate with the adjacent flute, and thus furnish a lubricant passageway leading to a point between the two cutting faces on top of the thread. In the embodiment illustrated the auxiliary thread groove is so deepened adjacent the leading end of the tap. At points more remote from the leading end the distance of the auxiliary groove from the base preferably increases, and the depth thereof preferably decreases, the normal thread, ordinarily, having no such groove.

By the construction described it will be noted that the top of the chamfered thread decreases in width as its distance from the leading end of the tap increases, and that in consequence, with the same or larger width of auxiliary thread groove, the width of the two cutting edges or faces 4 and 5, also decreases. Thus at the leading end of the tap a plurality of relatively axially disposed chips are cut, and as the tapping progresses the axial dimension of these chips decreases so that the power required to cut them is materially lessened.

Figure 4:
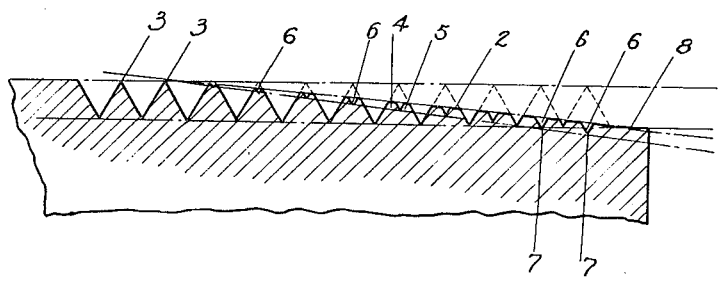
Fig. 4 is a diagram illustrative of some of the principles underlying the making of a tap in accordance with the present invention.

One manner of forming a tap in accordance with the present invention is to provide the same throughout the thread length with threads of normal character such as will give the desired pitch, shape and size to the threads desired in the article to be tapped, as for instance illustrated in Fig. 4 where the dotted lines indicate the cut away or chamfered parts of the normal thread. At the shank end of the threaded portion sufficient convolutions of the normal thread are left to give the final shape of thread desired, and the remaining threads are chamfered or tapered, their tops being cut away in conical planes providing the chamfered thread hereinbefore referred to. Thereafter the tops of the chamfered thread or threads are divided by auxiliary thread grooves as illustrated at 6 so as to provide a plurality of cutting faces 4 and 5. When the depth of auxiliary thread groove is sufficiently great it will open into the adjacent flute below the depth of cut effected by the immediately adjacent cutting faces and admit lubricant freely to such edges at a point within the width of the top between the normal thread grooves.

By dividing the cutting edge of the tap into a plurality of cutting edges or faces within the width of the top and by making the cutting edges quite narrow, the resultant chips will be so thread-like and pliable as to readily discharge through the flutes without binding and without requiring increased power consequent upon binding. Chips of a relatively fragile character are made which offer very little resistance to the operation of the tap as compared with that offered by the production of wide chips, and consequently the flute or groove of the tap may be made shallower with the result that the lands may be made wider. This widening of the lands increases the life of the tap as it permits of greater reduction of the lands by reason of wear, sharpening and the like. Furthermore, in addition to the more fragile character of chips produced, the auxiliary thread grooves furnish additional shoulders, especially adjacent the leading end of the tap, for taking hold of the material to be tapped, with the result that the liability to ream is not so great. Generally, in consequence of the above, the invention provides for saving of taps and reduction in costs.

Figure 3:
Fig. 3 illustrates a nut with the tap opening slightly inclined to the axis of the nut.

In Fig. 3 is illustrated a nut blank in which the tap opening is off center at the faces of the nut, and is inclined to the axis of the nut. When tapping such a nut, the tap of the present invention takes hold more readily by reason of the increased number of cutting faces referred to. The off centering in Fig. 3 is largely exaggerated over what usually occurs in practice, and is thus shown for clearer disclosure. The tap readily takes hold of the wall of such a nut below the face thereof and effects tapping without putting such lateral strain on the tap as to fracture the latter. The smooth leading end of the tap, indicated at 8, may be as short as desired so that the cutting may begin at the face of the nut. In case two nut blanks are simultaneously operated on by one tap, the fact that their tap openings are oppositely inclined to each other does not result in fracture of the tap. On the contrary, any lateral strain is immediately relieved by the cutting away of the metal, so that the thread is formed on each blank in true axial alignment, one with the other.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is—

1. A tap having a land provided with a thread chamfered to form a conical surface and forming a series of cutting faces having cutting edges of progressively decreasing dimensions from the leading end of the tap, and an auxiliary thread formed in said first thread having a base line inclined to said conical surface and extending below the base line of said first mentioned thread at the leading end of the tap.

2. A tap having a land provided with a thread chamfered to form a conical surface, and a series of notches formed in the tops of said chamfered thread and of gradually decreasing dimensions from the leading end of the tap and forming a series of plural cutting faces lying in said conical surface, said cutting faces having cutting edges decreasing in dimensions gradually from the leading end of the tap.

3. A tap having a thread chamfered to form a conical surface, an auxiliary thread groove formed in said chamfered thread, the base line of said auxiliary thread groove being inclined to the line of taper of said conical surface and forming a series of plural cutting faces of progressively varying dimensions.

In testimony whereof I affix my signature, in the presence of two witnesses.

CHARLES W. BOGART.

Witnesses:
 EVANS WARD,
 E. BURDSALL.